United States Defensive Publication [19] (H) [11] T959,002

Clark [43] June 7, 1977

[54] SPINNERET

[76] Inventor: Robert Ellis Clark, 611 Northgate Ave., Waynesboro, Va. 22980

[21] Appl. No.: 735,993

[22] Filed: Oct. 27, 1976

[51] Int. Cl.[2] ..... C22C 38/22

[52] U.S. Cl. ..... 75/126 C; 425/461; 425/464

[57] ABSTRACT

Spinnerets made of a stainless steel alloy containing 28% to 30% chromium, 3.5% to 4.2% molybdenum, and a maximum of 0.15% nickel have unexpectedly good resistance to corrosion when subjected to a $KNO_3/NaNO_2/NaNO_3$ salt bath at about 427° C (about 800° F) for cleaning, as well as unusually good resistance to corrosion when exposed to acrylonitrile polymer spinning solution. The overall corrosion rate, resulting from repeated cycles of spinning followed by salt bath cleaning, is surprisingly low, leading to a long expected wear life. The spinnerets have high strength, with good resistance to bulging in use.

1 Claim, No Sheets Drawing,

9 Pages Specification

The file of this unexamined application may be inspected and copies thereof may be purchased (849 O.G. 1221, Apr. 9, 1968).